United States Patent
Maron et al.

(10) Patent No.: US 6,176,352 B1
(45) Date of Patent: Jan. 23, 2001

(54) ELECTRIC BRAKE SYSTEM FOR A MOTOR VEHICLE

(75) Inventors: Christof Maron, Gehrden; Stefan Hauck, Hannover; Immanuel Henken, Laatzen; Thomas Dieckmann, Pattensen, all of (DE)

(73) Assignee: Continental Aktiengesellschaft, Hannover (DE)

( * ) Notice: Under 35 U.S.C. 154(b), the term of this patent shall be extended for 0 days.

(21) Appl. No.: 08/942,984

(22) Filed: Oct. 2, 1997

(30) Foreign Application Priority Data

Oct. 4, 1996 (DE) .............................. 196 40 995

(51) Int. Cl.[7] ............................................ F16D 66/00
(52) U.S. Cl. ............................ 188/1.11 E; 188/1.11 L; 188/72.1
(58) Field of Search ......................... 188/156, 1.11 R, 188/1.11 E, 71.1, 72.1, 370, 162; 192/30 W; 73/129, 862.621

(56) References Cited

U.S. PATENT DOCUMENTS

| 4,629,039 | * | 12/1986 | Imoto et al. | 188/72.1 |
| 4,784,244 | | 11/1988 | Carre et al. | 188/156 |
| 4,793,447 | * | 12/1988 | Taig et al. | 188/72.1 |
| 4,850,457 | * | 7/1989 | Taig | 188/156 |
| 4,854,424 | * | 8/1989 | Yamatoh et al. | 188/72.1 |
| 5,477,943 | * | 12/1995 | Enomoto et al. | 73/129 |

FOREIGN PATENT DOCUMENTS

| 0125872 | 11/1984 | (EP) . |
| 0125873 | 11/1984 | (EP) . |
| 0125874 | 11/1984 | (EP) . |
| 0163408 | 4/1985 | (EP) . |
| 0164846 | 12/1985 | (EP) . |

* cited by examiner

Primary Examiner—Robert J. Oberleitner
Assistant Examiner—Mariano Sy
(74) Attorney, Agent, or Firm—Walter Ottesen (57) ABSTRACT

The invention relates to an electric brake system for a motor vehicle wherein each wheel of the vehicle includes a brake actuator (2) assigned thereto. The invention also relates to a brake actuator for an electric brake system. During a braking operation, the brake linings (20a and 20b) are pressed against the brake disc (30) with a pregiven braking force by a braking-force device (10) of the brake actuator (2). At least one of the brake actuators (2) includes a sensor with which an elastic deformation of the braking-force device (10) or the brake yoke (18) is measured. This elastic deformation occurs during a braking operation. The braking force is determined from the measured elastic deformation and this braking force is then available for the control of the brake system.

29 Claims, 6 Drawing Sheets

ELECTRIC BRAKE SYSTEM FOR A MOTOR VEHICLE

FIELD OF THE INVENTION

The invention relates to an electric brake system for a motor vehicle such as a passenger car which, inter alia, is equipped with a wheel brake for each wheel of the vehicle. Each wheel brake includes a brake actuator having, inter alia, a braking-force device which applies a braking force to a brake lining during a braking operation whereby a braking force is generated at the wheel. The brake actuator includes an element which supports the applied braking force. the invention further related to a brake actuator for an electric brake system.

BACKGROUND OF THE INVENTION

In recent times, brake systems of the brake-by-wire type were developed for motor vehicles, especially for passenger cars. In a brake system of this kind, the brake command of the driver is made apparent by applying a foot force to a brake pedal and the effect of the foot force on the pedal is detected by a sensor and converted into an electric signal. The signal is then transmitted to brake actuators of which one is assigned to each wheel of the motor vehicle and each brake actuator exercises, inter alia, a braking force on the brake lining with the aid of a braking-force device. The braking-force device is driven by an electric motor. The brake linings are pressed against the brake discs of the wheel brakes under the influence of the braking force whereby a braking force is generated at the wheel of the motor vehicle.

The braking force which is applied by the braking-force device must be controlled in dependence upon the brake command of the driver of the motor vehicle. A simpler possibility to do this comprises supplying a specific motor current to the electric motors of the brake actuators in dependence upon the brake command of the driver in consequence of which a specific braking force is applied by the braking-force device of the brake actuators.

This possibility is however problematic in that the brake actuators always exhibit an internal friction which leads to a hysteresis in the brake actuators. For this reason, it is not possible to clearly assign a braking force to a pregiven motor current; instead, for a pregiven motor current, the braking force always occurs at an undetermined point within a braking-force interval. Accordingly, only via a measurement of the braking force in the brake actuators can it be clearly and precisely determined which braking force is generated for a pregiven motor current by a braking-force device of a brake actuator. The measured value can be used for the purpose of adapting the actual braking force to the desired braking force corresponding to the brake command of the driver of the motor vehicle. For the above reasons, it is desirable that the braking force be measurable in the brake actuators as easily as possible.

SUMMARY OF THE INVENTION

It is an object of the invention to provide an electric brake system wherein the braking force applied by the braking-force device can be easily measured in at least one of the brake actuators. It is still another object of the invention to provide a brake actuator suitable for a brake system of this kind.

The electric brake system of the invention is for a motor vehicle including a passenger car having a wheel brake for each wheel thereof, each wheel brake including a brake lining to which a braking force is imparted during a braking operation. The electric brake system includes: brake actuators corresponding to respective ones of the wheel brakes; each one of the brake actuators including a braking-force device for applying a braking force to the brake lining during a braking operation whereby a braking force is generated at the wheel; the one brake actuator also including an element for supporting the braking force; at least one of the braking-force device and the element being elastically deformable during the braking operation; and, at least one of the brake actuators including at least one sensor for measuring the elastic deformation occurring at one of the braking-force device and the element and for providing a signal representing the elastic deformation from which the braking force can be determined.

The advantages achieved by the invention are seen in that the braking force, which is generated by the braking-force device, is determined from the elastic deformation of a component of the brake actuator. This component is anyhow always present in the brake actuator. In this way, the sensor can be configured of a few components and be integrated into the brake actuator and be well protected against external mechanical loads.

According to another feature of the invention, at least a portion of the sensor is within the braking-force device, that is, within the element which supports the braking force. The advantage of this embodiment is seen in that the sensor, or at least a portion of the sensor, is surrounded on all sides by the braking-force device or by the element which supports the brake lining. In this way, protection against external mechanical loads is especially good.

According to still another feature of the invention, the stiffness of the braking-force device or the element which supports the brake lining, is reduced in the measuring range of the sensor. This can take place, for example, via a reduction in the cross section of the material or by inserting a resilient element or by inserting a material having a lower modulus of elasticity than the remaining material of the braking-force device or of the element which carries the brake lining. The advantage of this feature of the invention is that even a slight change of the braking force generates an additional elastic deformation of the braking-force device or of the element which supports the brake lining which can be measured by the sensor. Accordingly, the measurement is especially precise which makes possible a correspondingly good control of the electric brake system on the basis of the measured actual braking forces.

According to still another feature of the invention, the sensor is built into the brake actuator in such a manner that a clear measurement signal is generated thereby in the force-free state of the braking-force device. This clearly distinguishes from the measurement signals generated when the braking-force device applies a braking force. The advantage of this feature of the invention is that the force-free state of the braking-force device is reliably recognized. Accordingly, the situation described below cannot occur.

An elastic deformation and therefore a braking force (because of measurement inaccuracies) is detected by the sensor even though no braking force is applied by the braking-force device. In this case, the braking-force device is driven back further by the motor of the brake actuator until an elastic deformation identical to 0 is indicated by the sensor and therefore a force-free condition of the braking-force device. This can, in some instances, lead to damage to the brake actuator.

With this further feature of the invention, the case is reliably avoided that no elastic deformation and therefore the force-free condition of the braking-force device is indicated by the sensor (again, because of measuring inaccuracies) even though the braking-force device still applies force to the brake linings. Because of the defective indication of the sensor, the braking-force device is not driven back further by the electric motor so that the brake lining rubs continuously on the brake disc of the brake. In summary, it can be said that a destruction of the brake actuator or excessive wear of the brake linings is reliably avoided by this further feature of the invention.

A reliable indication of the force-free state of the braking-force device can be provided by the sensor. This is done in that the sensor is assembled from at least two parts. A measurement signal is only generated by the sensor when one part of the sensor is located in the operating region of the other part of the sensor and the sensor is built into the brake actuator in such a manner that the one part of the sensor in the force-free state of the braking-force device is not located in the operating region of the other part of the sensor. The first part of the sensor can be brought out of the operating region of the second part of the sensor in the force-free state of the braking-force device. This is achieved, for example, in that the first part of the sensor is operatively connected to a spring which is pressed together when a braking force is applied by the braking-force device and presses the first part of the sensor into the operating region of the second part of the sensor and, in the force-free state of the braking-force device, presses the first part of the sensor out of the operating region of the second part of the sensor.

BRIEF DESCRIPTION OF THE DRAWINGS

The invention will now be described with reference to the drawings wherein.

DESCRIPTION OF THE PREFERRED EMBODIMENTS OF THE INVENTION

In the description of the embodiments which follows hereinafter, reference is always made to a disc brake and that means especially that the element thereof, which supports the braking forces, is configured as a brake yoke. However, it is emphasized that the invention is not limited to a disc brake but is also applicable to drum brakes.

Figure 1:
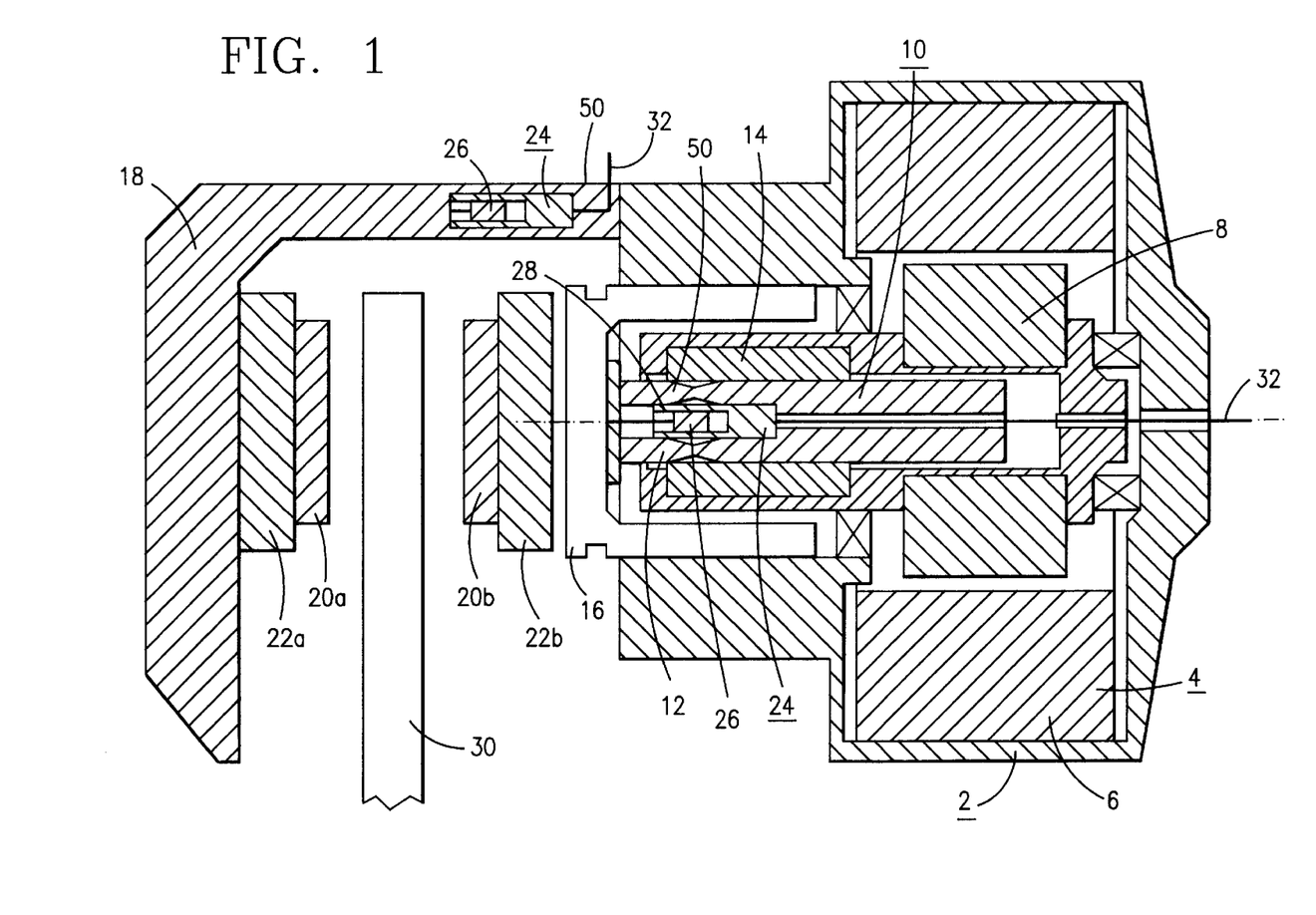
FIG. 1 is a side elevation view, in longitudinal section, showing a brake actuator according to the invention.

FIG. 1 shows a brake actuator 2 (not to scale) which operates together with a brake yoke 18 which, in turn, supports the brake linings 20a and 20b. The operation of brake actuators 2 of this kind is known per se so that only a short explanation thereof will follow.

The brake actuator 2 includes an electric motor 4 comprising a stator 6 and a rotor 8. With the aid of the stator 6 and rotor 8, a spindle nut 14 is rotated about an axis defined by the spindle 12. The rotational movement of the spindle nut 14 effects an axial movement of the spindle 12 and an axial movement of the brake piston 16. In this way, during a braking operation, the brake linings 20a and 20b, which coact with the brake piston 16, are likewise set into axial movement so that the brake linings 20a and 20b lie against the brake disc 30 after passing through the air gap and bring about a braking force. The braking force is dependent upon the braking force which is applied by the spindle 12 to the brake piston 16. After a braking operation, the brake linings 20a and 20b, the brake piston 16 and the spindle 12 are all moved back to their starting positions by return forces, that is, by the reverse drive of the electric motor 4.

The braking force is applied by the braking-force device 10 (especially by the spindle 12) via the brake piston 16 on the brake linings 20a and 20b. This braking force leads to a force in the spindle 12 or in the brake yoke 18 which is, in magnitude, precisely as large as the braking force but in the opposite direction. This force leads to an elastic deformation of the braking-force device 10 and especially of the spindle 12 or to an elastic deformation of the brake yoke 18 which can be measured with the aid of a sensor 24.

For this purpose, the sensor 24 is either mounted in a cavity of the spindle 12 provided therefor in such a manner that the spindle 12 coaxially surrounds the sensor 24 or, the sensor is located in a cavity of the brake yoke 18 provided therefor. The braking force applied to the brake linings 20a and 20b can be directly measured from the elastic deformation of the braking-force device 10 (especially the spindle 12 or the brake yoke 18) which is measured by the sensor 24.

The elastic deformation to be measured can be amplified in that the stiffness of the spindle 12 or of the brake yoke is reduced in a targeted manner by inserting a resilient element in the region 50 of the sensor 24. This can be done, for example, with a resilient disc or by inserting a material having a modulus of elasticity in the region 50 which is less than the modulus of elasticity of the surrounding material. A further possibility is that the cross section of the material can be reduced in the region 50 as shown in FIG. 1.

The sensor 24, which is shown in FIG. 1, is configured as an LVDT sensor having an operation which is known per se so that only a short description is needed. The LVDT (linear variable differential transformer) sensor can, for example, be obtained from the Lucas Schaevitz Company and from the Micro-Epsilon Company. The ferromagnetic core 26 dips deeper into the coil of the LVDT sensor 24 because of the elastic deformation of the braking-force device 10 and especially because of the deformation of the spindle 12 or because of the elastic deformation of the brake yoke 18. As a consequence thereof, the measuring signal applied to the connecting line 32 changes.

Figure 2:
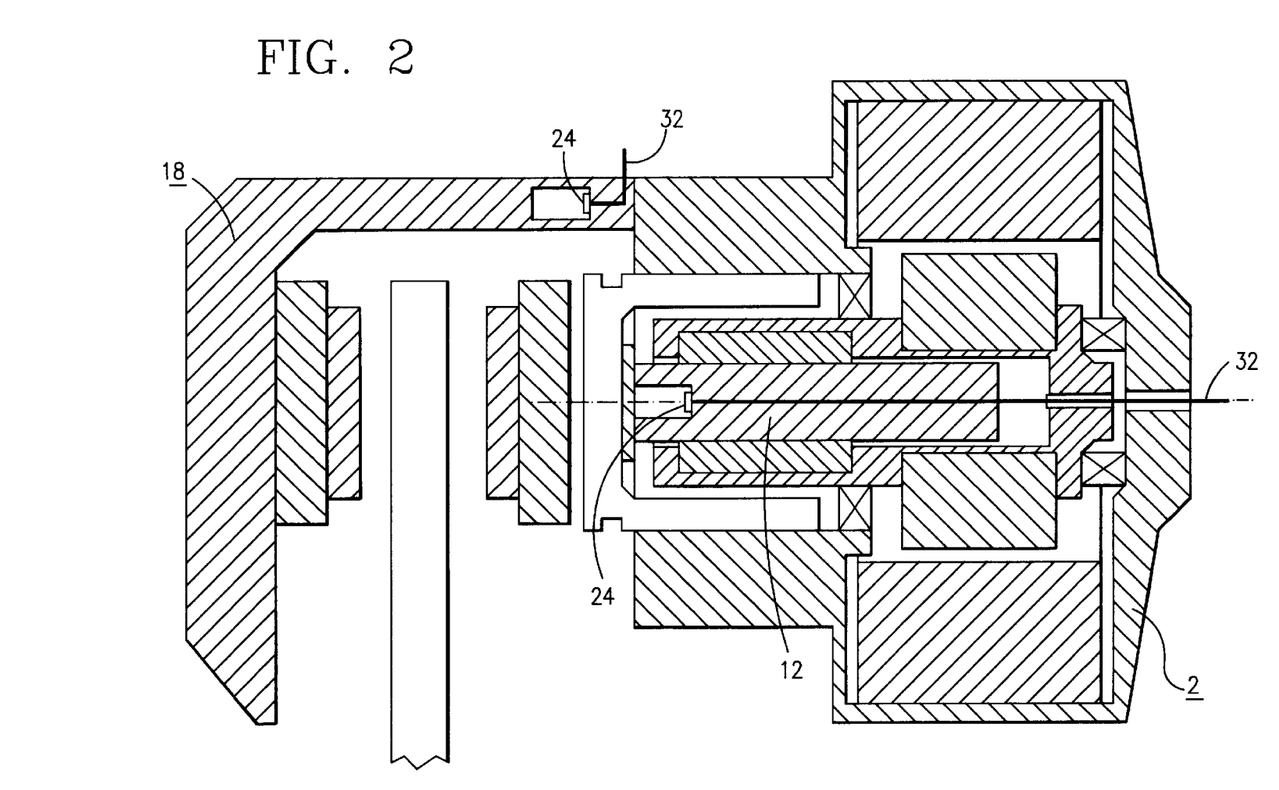
FIG. 2 is a second embodiment of a brake actuator, in longitudinal section, equipped with a sensor having a different configuration and a different mode of operation than the sensor of the brake actuator shown in FIG. 1.

FIG. 2 shows a brake actuator 2 and a brake yoke 18 and the brake actuator 2 is configured precisely as shown in FIG. 1. The only difference is that the sensor 24, which is accommodated in the cavity of the spindle 12 of the braking-force device 10 or in the cavity of the brake yoke 18, has another configuration and another mode of operation which is explained below.

The hollow cavity, which is contained in the spindle 12 or in the brake yoke 18, is filled with a fluid and contains a pressure sensor 24 which is preferably attached to a wall of the cavity space. The signal is transmitted via a connecting line 32 for evaluation.

As a consequence of a braking operation, an elastic deformation of the spindle 12 or of the brake yoke 18 occurs so that the volume of the hollow space in the spindle 12 or in the brake yoke 18 is reduced and the pressure in the fluid increases. The increase in pressure is detected by the pressure sensor 24 and a corresponding signal is outputted onto the connecting line 32 for evaluation so that the elastic deformation and therefore the applied braking force can be determined from the signal.

Figure 3:
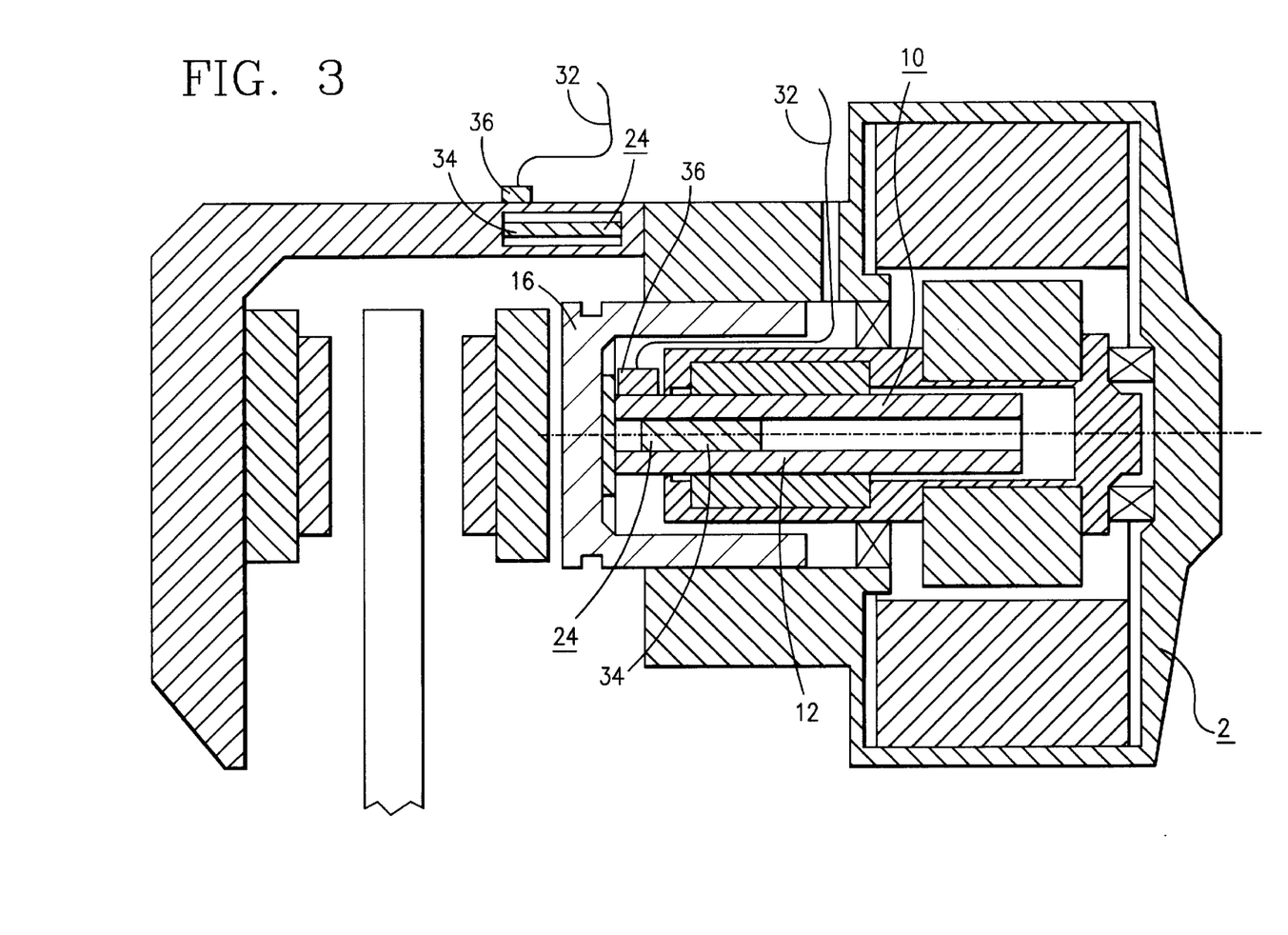
FIG. 3 shows a third embodiment of the brake actuator of the invention, in longitudinal section, equipped with a sensor having a configuration and mode of operation different than the sensors of the brake actuators shown in FIGS. 1 and 2.

FIG. 3 shows a brake actuator 2 which is configured precisely as the brake actuator 2 shown in FIG. 1 and likewise coacts with a brake yoke 18. The single difference is that the sensor 24 exhibits another configuration and another mode of operation which will be explained below. Here again, a detailed explanation is unnecessary because the sensor is known and described in detail in the SAE Technical Paper Series 910856.

The sensor 24 comprises a permanent magnet core which is concentrically surrounded by the spindle 12. The spindle 12 is made of ferromagnetic material in the region of the permanent-magnetic core 34. The magnetic zones of this ferromagnetic material are directed in a preferred direction under the influence of the permanent-magnetic core 34 so that a magnetic field is developed by the ferromagnetic material of the spindle 12 in the region of the permanent-magnetic core 34. This magnetic field is superposed on the magnetic field generated by the permanent-magnetic core 34 in accordance with the superposition principle. When there is an elastic deformation of the braking-force device 10 (especially the spindle 12) because of a braking operation, then the magnetic field in this region changes under the influence of the pressure because of the displacement of the magnetic zones. This pressure is applied to the ferromagnetic region of the spindle 12 with this elastic deformation. As a consequence of the above, a change of the overall magnetic field takes place and this change is detected by a Hall sensor 36. A corresponding signal is outputted to the connecting line 32 and the braking force, which is applied during the braking operation, is determined from the signal of the Hall sensor 36.

The special advantage of the embodiment shown in FIG. 3 is that the Hall sensor 36 is located outside of the spindle 12 and therefore a connecting line like the connecting line 32 is unnecessary in the spindle 12. Nonetheless, the Hall sensor 36 is well protected against external mechanical loads because it is surrounded by the brake piston 16.

Figure 4:
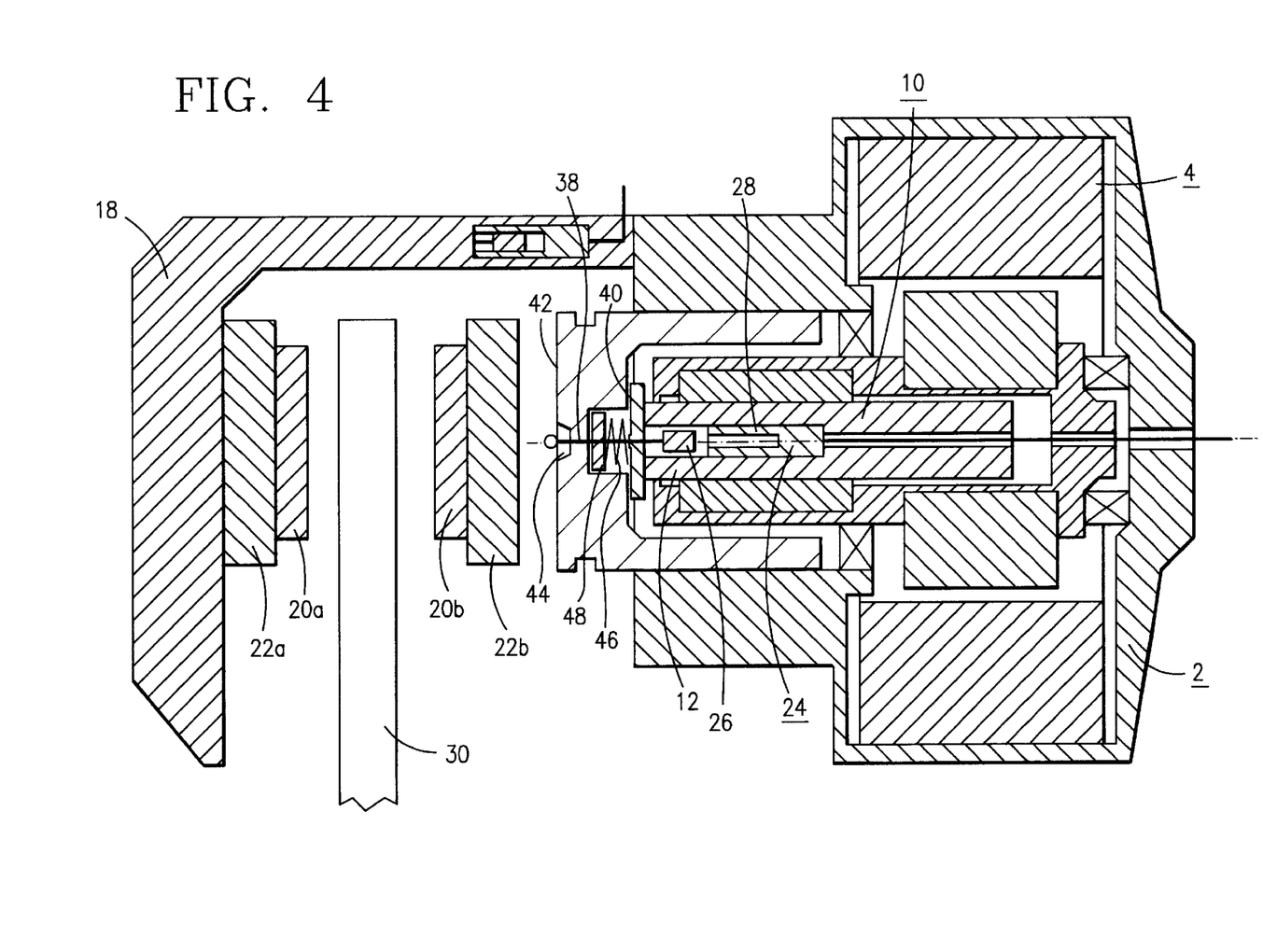
FIG. 4 is still another embodiment of the brake actuator of the invention, in longitudinal section, equipped with a sensor which is a modification of the sensor of the brake actuator shown in FIG. 1.

FIG. 4 shows a brake actuator 2 which is configured precisely as that shown in FIG. 1 and coacts with a brake yoke 18. The sensor 24 is mounted in a hollow space of the spindle 12 of the braking-force device 10. The sensor 24 is modified with respect to the sensor shown in FIG. 1 in that the force-free state of the spindle 12 and therefore the liftoff of the brake linings 20a and 20b from the brake disc 30 can be reliably determined with the aid of the sensor 24. For this purpose, the rod 38 is guided through a first bore in the end face 40 of the spindle 12 and through a second bore in the end face 42 of the brake piston 16. The soft-magnetic core 26 is guided in the coil 28 with the aid of the rod 38. The rod 38 is configured to be so long that the end of the rod 38 projects beyond the end face 42 of the brake piston 16 in the force-free state of the braking-force device 10 (especially of the spindle 12) and lies in the air gap between the brake-lining support 22b and the end face 42 of the brake piston 16. The end of the rod 38 faces away from the soft-magnetic core 26.

What happens during a braking operation will now be explained.

The spindle 12 of the braking-force device 10, and therefore the brake piston 16, is set into an axial movement so that the end face 42 lies against the rear end of the brake-lining support 22b after passing through the air gap between the brake-lining support 22b and the end face 42 of the brake piston 16. For the axial movement of the brake piston 16 in the direction of the brake-lining support 22b, the rod 38 is pushed into a recess 44 of the brake piston 16. In this way, the stop 48 on the rod 38 is moved toward the electric motor 4 and compresses the spring 46. With the movement of the rod 38, the soft-magnetic core 26 of the sensor 24 plunges into the operating region of the coil 28 and only then is a signal generated by the sensor 24. A further increase of the braking force leads to an elastic deformation of the braking-force device 10 (especially the spindle 12) which is detected by the sensor 24 as described above with reference to FIG. 1.

At the end of the braking operation, the spindle 12 of the braking-force device 10, and therefore the brake piston 16, moves in the axial direction away from the brake-lining support 22b so that an air gap is again formed between the rear end of the brake-lining support 22b and the end face 42 of the brake piston 16. At that moment at which the end face 42 lifts off of the rear end of the brake-lining support 22b, the compressed spring 46 begins to expand and pushes the end of the rod 38, which faces away from the soft-magnetic core 26, again into the air gap so that, after the braking operation, the start position shown in FIG. 4 is again reached and the soft-magnetic core 26 is no longer located in the operating region of the coil 28. In this way, in the force-free state of the braking-force device 10 (especially of the spindle 12), no signal (or no significant signal) is generated by the sensor 24 and the released brake is reliably indicated. The released brake is characterized by a lifting of the brake linings 20a and 20b from the brake disc 30. The force-free state is only indicated by an air gap present between the brake-lining support 22b and the brake piston 16. However, this ensures that the brake linings 20a and 20b are actually lifted off of the brake disc 30 (for example, because of the brake disc impact).

According to still another embodiment of the invention, the sensor 24 includes a reflecting membrane 60 onto which light is guided which is reflected at the membrane 60. The membrane 60 is likewise deformed or displaced out of its rest position as a consequence of the elastic deformation of the braking-force device 10 or of the brake yoke 18. In this way, the reflection of the light at the membrane is again changed (for example, the reflection angle of the light changes with a deformation). The change of the reflection has a clear relationship to the deformation of the braking-force device 10 or of the brake yoke 18.

In the following, a description is provided as to how the sensor 24, which includes the reflecting membrane, can, for example, be configured.

Figure 5:
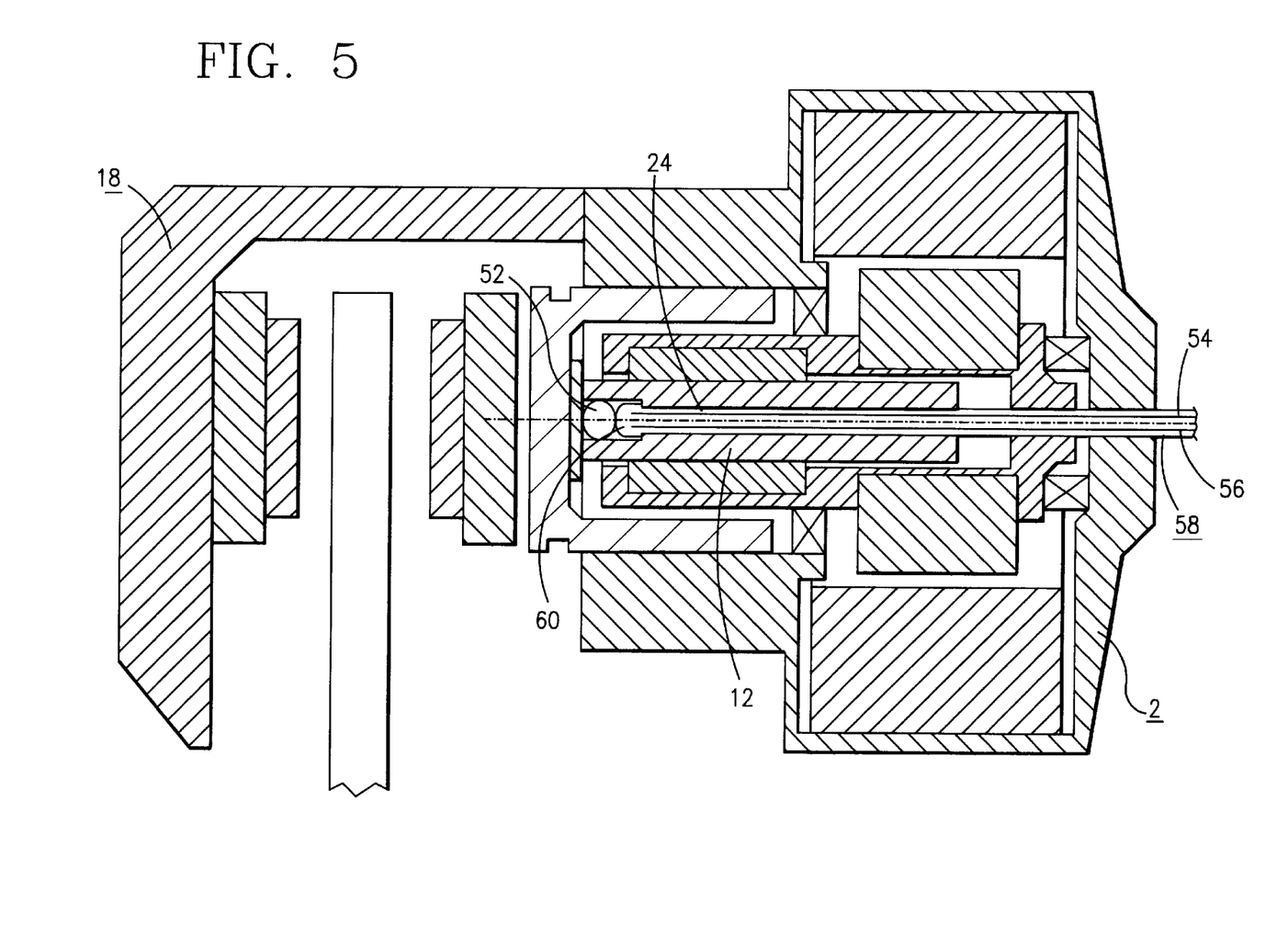
FIG. 5 shows another embodiment of the brake actuator of the invention and corresponds to the brake actuator shown in FIG. 1 but has a coupling element in the form of a ball; and, FIG. 6 is another embodiment of the brake actuator of the invention, in longitudinal section, wherein the sensor is positioned somewhat differently than in FIG. 1.

FIG. 5 shows a brake actuator 2 which is configured precisely in the same manner as the brake actuator shown in FIG. 1 and coacts with a brake yoke 18. The spindle 12 of the brake actuator 2 includes a hollow space in which a coupling element 52 is located. Here, the coupling element 52 is in the form of a ball. The ball 52 is operatively connected to a reflecting membrane 60 of the sensor 24.

In addition to the membrane 60, the sensor 24 also includes a first light conductor 54 and a second light conductor 56 which run in a cable 58. This cable is brought out of the brake actuator 2 via a channel in the spindle 12. The first light conductor 54 is disposed outside of the brake actuator 2. Light is coupled into the end of the first light conductor 54 with the aid of a light-emitting diode. The light propagates up to the other end of the first light conductor 54 which is disposed in the hollow space of the spindle 12 and there exits from the first light conductor. The exiting light is reflected by the membrane 60 of the sensor 24 and, after the reflection, is coupled into the second light conductor 56. The light propagates within the second light conductor up to the end of the second light conductor which is disposed outside of the brake actuator 2 and there again exits from the light conductor 56. The intensity of the light exiting from the second light conductor 56 is measured outside of the brake actuator 2, for example, with the aid of a photodiode.

What happens during a braking operation will be explained below.

The spindle 12 of the braking-force device 10 is elastically deformed and, as a consequence thereof, a force is applied to the membrane 60 by the ball 52. Because of this deformation, the portion of the light which is coupled into the second light conductor 56 changes after the reflection at the membrane 60. At the output of the second light conductor 56 outside of the brake actuator 2, a light intensity is measured with the aid of the photodiode and this light intensity is different from the light intensity of the brake actuator 2 which is not actuated. The deformation of the membrane 60 and therefore the change of the measured light intensity forms a clear relationship with the braking force which is applied with the aid of the spindle 12 to the brake linings 20*a* and 20*b*. In this way, the applied braking force is determined with the aid of the sensor described in connection with FIG. 5.

Figure 6:
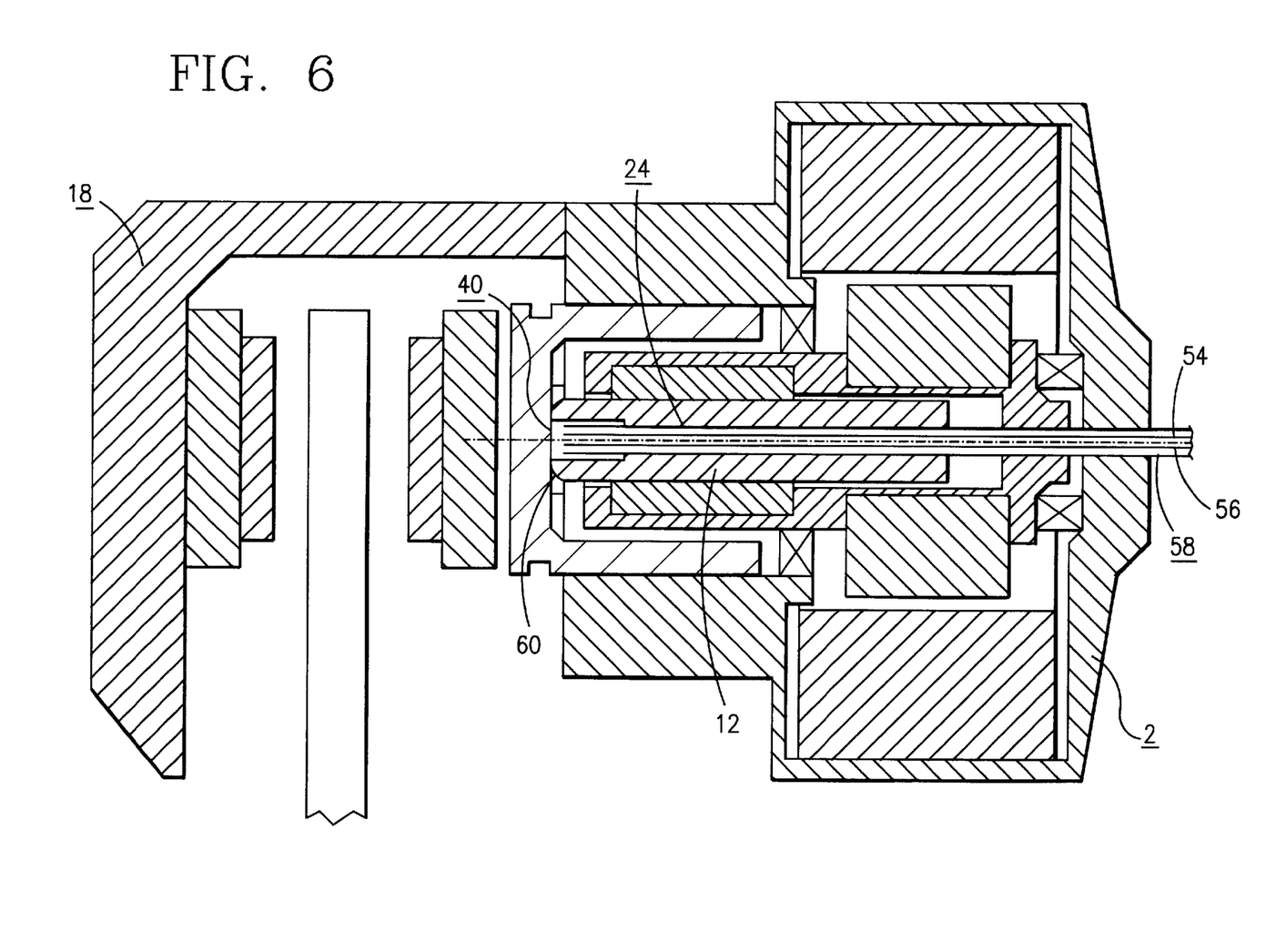

FIG. 6 shows a brake actuator 2 which is configured in the same manner as the brake actuator shown in FIG. 1 and coacts with a brake yoke 18. The sensor 24 shown in FIG. 6 is, for the most part, configured as the sensor 24 shown in FIG. 5. A difference is seen only in that the membrane 60 of the sensor 24 is not, as shown in FIG. 5, located in the hollow space 40 of the spindle 12; instead, the hollow face 40 of the spindle 12 is configured as the membrane 60.

In a braking operation with the brake actuator 2 shown in FIG. 6, a direct deformation of the membrane 60 occurs which, in turn, leads to a change of the light intensity at the output of the second light conductor 56. The method of measuring the braking force in the brake actuator shown in FIG. 6 is not different from the measuring method associated with the brake actuator shown in FIG. 5. A sensor of the kind described with respect to FIGS. 5 and 6 can be obtained, for example, from the OPTRAND Company, 46155 Five Mile Road, Plymouth, Mich. 48170.

It is understood that the foregoing description is that of the preferred embodiments of the invention and that various changes and modifications may be made thereto without departing from the spirit and scope of the invention as defined in the appended claims.

What is claimed is:

1. An electric brake system for a motor vehicle including a passenger car having a wheel brake for each wheel thereof, each wheel brake including a brake lining to which a braking force is imparted during a braking operation, the electric brake system comprising:

brake actuators corresponding to respective ones of the wheel brakes;

each one of said brake actuators including a braking-force device for applying a braking force to said brake lining during a braking operation whereby a braking force is generated at the wheel;

said braking-force device of said one brake actuator undergoing an elastic deformation in response to said braking force;

said one brake actuator also including an element for supporting said braking force and said element being elastically deformable in response to said braking force;

at least one sensor mounted in at least one of said braking-force device and said element of each one of said brake actuators for measuring the elastic deformation occurring therein as a consequence of said braking force and from which elastic deformation said braking force can be measured; and, said sensor being arranged only within said at least one of said braking-force device and said element.

2. The electric brake system of claim 1, wherein said at least one of said braking-force device and said element is configured so as to reduce the stiffness thereof in the measuring region of said sensor.

3. The electric brake system of claim 1, wherein said sensor is built into said brake actuator so as to generate a clear signal when said braking-force device is in a force-free state.

4. The electric brake system of claim 3, wherein said sensor includes first and second parts; said second part defining an operating region; said sensor being configured so as to only generate a measurement signal when said first part is in said operating region of said second part; and, said sensor being built into said brake actuator so as to cause said first part to be outside of said operating region of said second part when said braking-force device is in said force-free state.

5. The electric brake system of claim 1, wherein said sensor comprises: a fluid-filled cavity provided in one of said braking-force device and said element with the fluid undergoing changes in pressure because of said elastic deformation; and, a pressure-detecting device mounted in said fluid-filled cavity for detecting said changes in pressure.

6. The electric brake system of claim 1, wherein said sensor comprises: a permanent magnetic first material; a ferromagnetic second material which is magnetized under the influence of said first material; said first and second materials being disposed in said brake actuator so as to cause the magnetization of said second material to change in response to said elastic deformation; and, means for measuring said change in said magnetization.

7. The electric brake system of claim 1, wherein said sensor comprises: a reflecting membrane mounted in said brake actuator so as to be deflectable or displaceable in response to said elastic deformation; and, means for directing light onto said reflecting membrane.

8. The electric brake system of claim 7, said means for directing light onto said reflecting membrane being a first light conductor for directing said light onto said reflecting membrane; and, said sensor further including a second light conductor for receiving light reflected at said reflecting membrane.

9. The electric brake system of claim 7, said reflecting membrane being mounted in one of said braking-force device and said element.

10. The electric brake system of claim 9, wherein said sensor further comprises a coupling element operatively connected to said membrane.

11. The electric brake system of claim 7, wherein said braking-force device includes an end face for applying said braking force to said brake lining; and, said membrane is mounted at said end face.

12. The electric brake system of claim 7, wherein said braking-force device includes an end face for applying said braking force to said brake lining; and, said membrane being configured as said end face.

13. An electric brake system for a motor vehicle including a passenger car having a wheel brake for each wheel thereof, each wheel brake including a brake lining to which a braking force is imparted during a braking operation, the electric brake system comprising:

brake actuators corresponding to respective ones of the wheel brakes;

each one of said brake actuators including a braking-force device for applying a braking force to said brake lining during a braking operation whereby a braking force is generated at the wheel;

said braking-force device of said the brake actuator being elastically deformable in response to said braking force;

said one brake actuator also including an element for supporting said braking force and said element undergoing an elastic deformation in response to said braking force;

at least one of said brake actuators including at least one sensor for measuring the elastic deformation occurring at one of said braking-force device and said element and for providing a signal representing said elastic deformation from which said braking force can be determined; and, said sensor including a coil and a ferromagnetic core mounted in one of said braking-force device and said element so as to cause said ferromagnetic core to be movable relative to said coil under the influence of said elastic deformation of said one of said braking-force device and said element so that a measurement signal is generated in said coil.

14. A brake actuator for an electric brake system for a motor vehicle having a wheel brake, the wheel brake including a brake lining to which a braking force is imparted during a braking operation, the brake actuator comprising:

a braking-force device for applying a braking force to said brake lining during a braking operation whereby a braking force is generated at the wheel;

said braking-force device being elastically deformable in response to said braking force;

an element for supporting said braking force and said element undergoing an elastic deformation in response to said braking force;

at least one sensor mounted in at least one of said braking-force device and said element for measuring the elastic deformation occurring therein as a consequence of said braking force and from which elastic deformation said braking force can be measured; and, said sensor being arranged only within said at least one of said braking-force device and said element.

15. The electric brake actuator of claim 14, wherein said at least one of said braking-force device and said element being configured so as to reduce the stiffness thereof in the measuring region of said sensor.

16. The electric brake actuator of claim 14, wherein said sensor is built into said brake actuator so as to generate a clear signal when said braking-force device is in a force-free state.

17. The electric brake actuator of claim 16, wherein said sensor includes first and second parts; said second part defining an operating region; said sensor is configured so as to only generate a measurement signal when said first part is in said operating region of said second part; and, said sensor being built into said brake actuator so as to cause said first part to be outside of said operating region of said second part when said braking-force device is in said force-free state.

18. The electric brake system of claim 14, wherein said sensor comprises: a fluid-filled cavity provided in one of said braking-force device and said element with the fluid undergoing changes in pressure because of said elastic deformation; and, a pressure-detecting device mounted in said fluid-filled cavity for detecting said changes in pressure.

19. The electric brake system of claim 14, wherein said sensor comprises: a permanent magnetic first material; a ferromagnetic second material which is magnetized under the influence of said first material; said first and second materials being disposed in said brake actuator so as to cause the magnetization of said second material to change in response to said elastic deformation; and, means for measuring said change in said magnetization.

20. The electric brake system of claim 14, wherein said sensor comprises: a reflecting membrane mounted in said brake actuator so as to be deflectable or displaceable in response to said elastic deformation; and, means for directing light onto said reflecting membrane.

21. The electric brake system of claim 20, said means for directing light onto said reflecting membrane being a first light conductor for directing said light onto said reflecting membrane; and, said sensor further including a second light conductor for receiving light reflected at said reflecting membrane.

22. The electric brake system of claim 20, said reflecting membrane being mounted in one of said braking-force device and said element.

23. The electric brake system of claim 22, wherein said sensor further comprises a coupling element operatively connected to said membrane.

24. The electric brake system of claim 20, wherein said braking-force device includes an end face for applying said braking force to said brake lining; and, said membrane is mounted at said end face.

25. The electric brake system of claim 20, wherein said braking-force device includes an end face for applying said braking force to said brake lining; and, said membrane being configured as said end face.

26. The electric brake actuator of claim 14, wherein said at least one of said braking-force device and said element has a cavity formed therein; and, said at least one sensor being disposed in said cavity.

27. The electric brake actuator of claim 26, wherein said braking-force device and said element each are made of a material having a modulus of elasticity; and, said cavity includes a resilient element disposed in surrounding relationship to said sensor and said resilient element being made of a material having a modulus of elasticity less than said modulus of elasticity of said at least one of said braking-force device and said element.

28. The electric brake actuator of claim 14, wherein said sensor includes only said sensor itself and is embedded within and connected to said at least one of said brake-actuator device and said element actually transmitting said braking force.

29. A brake actuator for an electric brace system for a motor vehicle hearing a wheel brake, the wheel brake including a brake lining to which a braking force is imparted during a braking operation, the brake actuator comprising:

a braking-force device for applying a braking force to said brake lining during a braking operation whereby a braking force is generated at the wheel;

said braking-force device undergoing an elastic deformation in response to said braking force;

an element for supporting said braking force and said element being elastically deformable in response to said braking force;

at least one of said brake actuators including at least one sensor for measuring the elastic deformation occurring at one of said braking-force device and said element and for providing a signal representing said elastic deformation from which said braking force can be determined, and, said sensor including a coil and a ferromagnetic core mounted in one of said braking-force device and said element so as to cause said ferromagnetic core to be movable relative to said coil under the influence of said elastic deformation of said one of said braking-force device and said element so that a measurement signal is generated in said coil.

* * * * *

UNITED STATES PATENT AND TRADEMARK OFFICE
CERTIFICATE OF CORRECTION

PATENT NO. : 6,176,352 B1
DATED : January 23, 2001
INVENTOR(S) : Christof Maron, Stefan Hauck, Immanuel Henken and Thomas Dieckmann It is certified that error appears in the above-identified patent and that said Letters Patent is hereby corrected as shown below:

Column 1,
Line 12, delete "the" (second occurrence) and substitute -- The -- therefor.

Column 7,
Line 40, delete "face" and substitute -- space -- therefor.

Column 9,
Line 20, delete "the" and substitute -- one -- therefor.

Column 10,
Line 64, delete "brace" and substitute -- brake -- therefor.
Line 65, delete "hearing" and substitute -- having -- therefor.

Column 12,
Line 2, delete "determined" and substitute -- determined; -- therefor.

Signed and Sealed this

Second Day of April, 2002

Attest:

JAMES E. ROGAN
Attesting Officer
Director of the United States Patent and Trademark Office